(12) United States Patent
Brady et al.

(10) Patent No.: US 8,751,523 B2
(45) Date of Patent: Jun. 10, 2014

(54) SNAPSHOT BASED SEARCH

(75) Inventors: Donald James Brady, Woodland Park, CO (US); Eric Brandon Tamura, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 358 days.

(21) Appl. No.: 12/479,660

(22) Filed: Jun. 5, 2009

(65) Prior Publication Data

US 2010/0312783 A1 Dec. 9, 2010

(51) Int. Cl.
*G06F 17/30* (2006.01)

(52) U.S. Cl.
USPC .......................... 707/769; 707/639; 707/640

(58) Field of Classification Search
None
See application file for complete search history.

(56) References Cited

U.S. PATENT DOCUMENTS

| | | | |
|---|---|---|---|
| 5,440,735 A * | 8/1995 | Goldring | 707/999.008 |
| 6,278,452 B1 * | 8/2001 | Huberman et al. | 715/764 |
| 6,282,175 B1 * | 8/2001 | Steele et al. | 370/254 |
| 6,748,504 B2 * | 6/2004 | Sawdon et al. | 711/162 |
| 6,829,617 B2 * | 12/2004 | Sawdon et al. | 707/999.004 |
| 6,959,310 B2 * | 10/2005 | Eshel et al. | 707/999.001 |
| 6,993,539 B2 * | 1/2006 | Federwisch et al. | 707/999.01 |
| 7,100,089 B1 * | 8/2006 | Phelps | 714/42 |
| 7,403,960 B2 * | 7/2008 | Kodama | 707/639 |
| 7,555,504 B2 * | 6/2009 | Bixby et al. | 707/999.01 |
| 7,603,391 B1 * | 10/2009 | Federwisch et al. | 707/999.01 |
| 7,707,184 B1 * | 4/2010 | Zhang et al. | 707/645 |
| 7,761,456 B1 * | 7/2010 | Cram et al. | 707/754 |
| 7,844,582 B1 * | 11/2010 | Arbilla et al. | 707/694 |
| 7,882,067 B2 * | 2/2011 | Saika | 707/639 |
| 7,958,168 B2 * | 6/2011 | Chen et al. | 707/822 |
| 8,307,154 B2 * | 11/2012 | Stabrawa et al. | 711/113 |
| 8,370,591 B2 * | 2/2013 | Tan et al. | 711/162 |
| 8,589,347 B2 * | 11/2013 | Erofeev | 707/634 |
| 2003/0167380 A1 * | 9/2003 | Green et al. | 711/136 |
| 2004/0088301 A1 * | 5/2004 | Mahalingam et al. | 707/100 |
| 2006/0036655 A1 * | 2/2006 | Lastovica, Jr. | 707/203 |
| 2006/0047931 A1 * | 3/2006 | Saika | 711/162 |
| 2006/0143242 A1 * | 6/2006 | Hara | 707/203 |
| 2008/0034013 A1 | 2/2008 | Cisler et al. | |
| 2008/0256311 A1 | 10/2008 | Lee | |
| 2008/0301101 A1 * | 12/2008 | Baratto et al. | 707/999.003 |
| 2008/0320258 A1 | 12/2008 | Wayda et al. | |
| 2009/0063422 A1 * | 3/2009 | Kodama | 707/3 |
| 2009/0292681 A1 * | 11/2009 | Wood et al. | 707/999.003 |
| 2009/0319486 A1 * | 12/2009 | Surlaker et al. | 707/999.003 |
| 2011/0093471 A1 * | 4/2011 | Brockway et al. | 707/747 |

\* cited by examiner

*Primary Examiner* — Neveen Abel Jalil
*Assistant Examiner* — Jacques Veillard
(74) *Attorney, Agent, or Firm* — Blakely, Sokoloff, Taylor & Zafman LLP

(57) ABSTRACT

Embodiments of the invention receive a search query from a user. In response to the search query, a snapshot of the file system in its current state is taken. A coherent search of the snapshot is performed using the search query. Results of the search are presented to a user. In other embodiments, a subsequent snapshot of the file system is taken after the first search is finished. A difference between the first snapshot and the subsequent snapshot is computed, and this difference is searched using the search query. Results of both searches are merged and results are presented to a user.

8 Claims, 8 Drawing Sheets

SNAPSHOT BASED SEARCH

FIELD OF THE INVENTION

Embodiments of the invention are generally directed toward searching file systems, and more specifically to searching snapshots of file systems.

BACKGROUND

Searching a file system requires iterating through a directory hierarchy to determine if elements of the file system such as a file or directory matching a search query are present. Searching a live file system takes time, and during that time the hierarchy of the file system may change. In order to prevent file system modification while conducting a search, it must be kept in a read-only state while conducting the search. Performing a coherent search of a live file system requires that the file system remain static during the search.

FIG. 1 is a diagram illustrating a live file system search 100. A search begins at root node 101 and progresses down, moving from left to right. Home directory 103 is searched, including user directory 109. Next, documents directory 105 is searched. While directory 105 is being searched, games directory 107 is relocated 111 from its position directly under root 101 into user directory 109.

When the search of documents directory 105 is finished, the search is finished, since by the time the search reaches point 113, no files or directories are present. As a result, games directory 107 is not searched.

SUMMARY

Embodiments of the invention receive a search query from a user. In response to the search query, a snapshot of the file system in its current state is taken. A coherent search of the snapshot is performed using the search query. Results of the search are presented to a user.

In other embodiments, a subsequent snapshot of the file system is taken after the first search is finished. A difference between the first snapshot and the subsequent snapshot is computed, and this difference is searched using the search query. Results of both searches are merged and results are presented to a user.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

Figure 1:
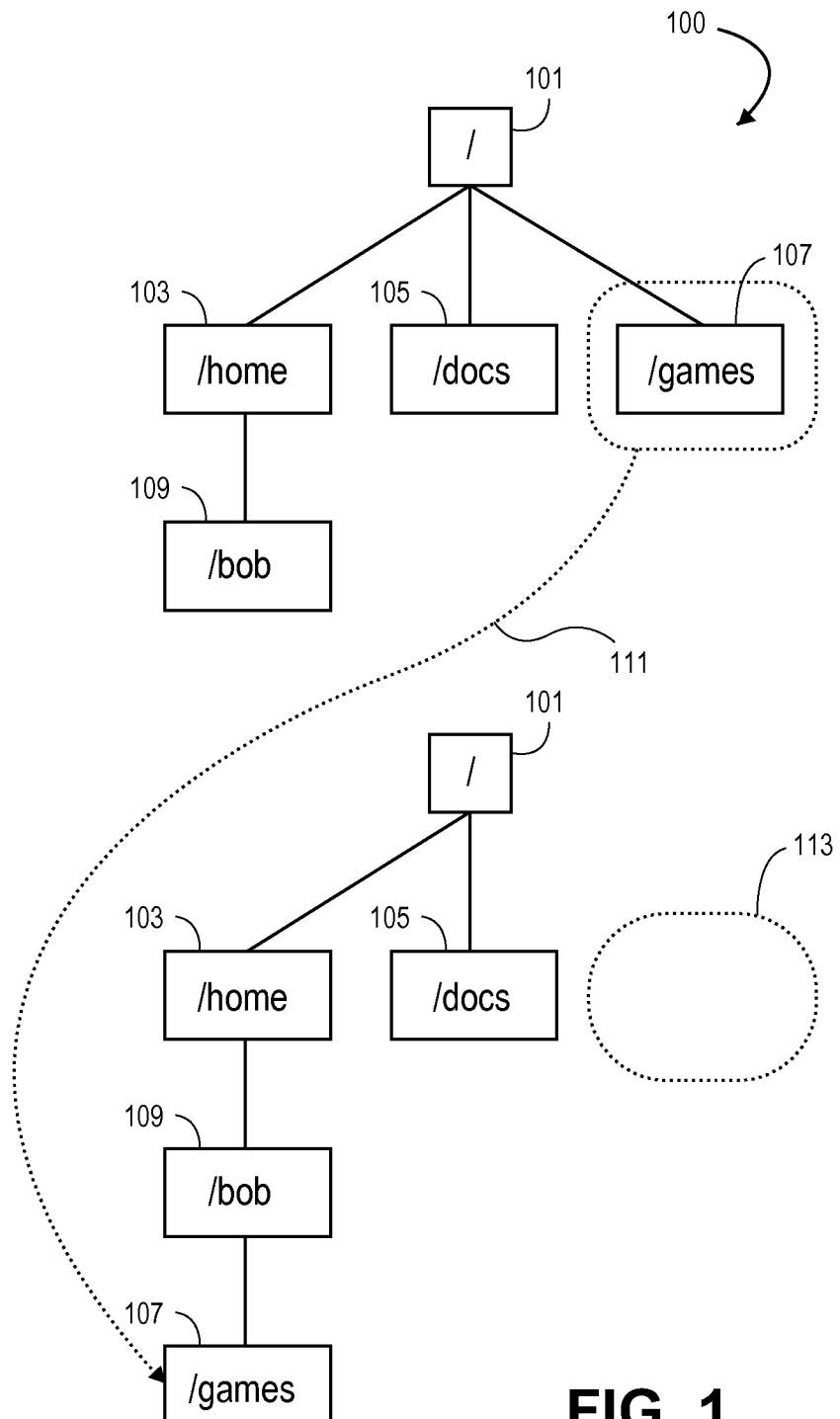
FIG. 1 is a diagram illustrating a live file system search.
Figure 2:
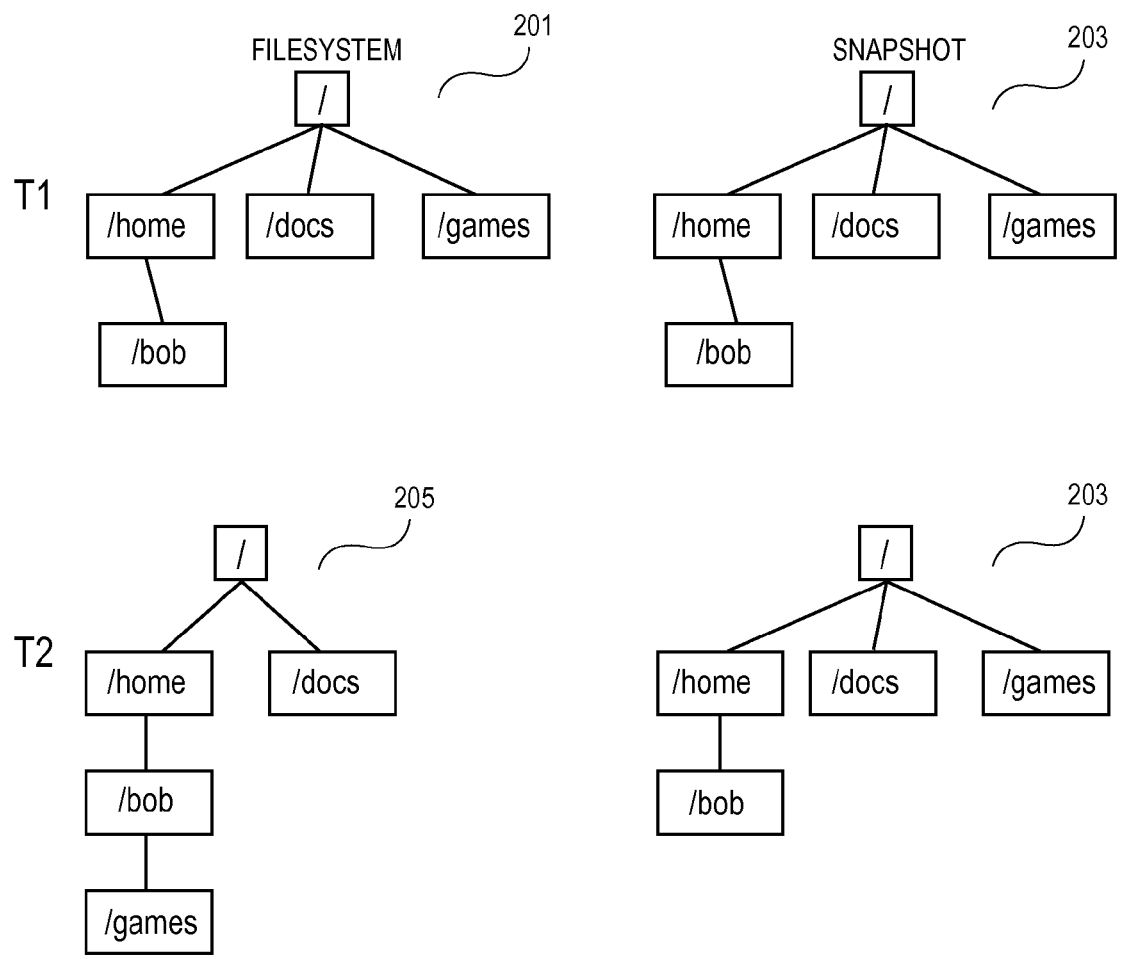
FIG. 2 is a diagram illustrating a coherent snapshot search according to an embodiment of the invention.

FIG. 2 is a diagram illustrating a live file system search and a coherent snapshot search. At time T1, a search request is received. A snapshot 203 is taken of file system 201 at time T1. In one embodiment, a snapshot is a stable read-only copy of the file system as it existed at one point in time.

A search of the snapshot 203 is initiated in response to the search request. At time T2, the search of snapshot 203 has completed its search of the /docs directory. Between T1 and T2, the file system has changed from file system 201 into file system 205. In file system 205, the /games directory has been moved into the /bob directory. However, snapshot 203 remains the same. As a result, the search of snapshot 203 will search the /games directory. In one embodiment, the search determines that a location of a search result has changed and identifies the current location of the search result (e.g., by reviewing a file system log, or backtracking from the search result to determine its new path).

Figure 3:
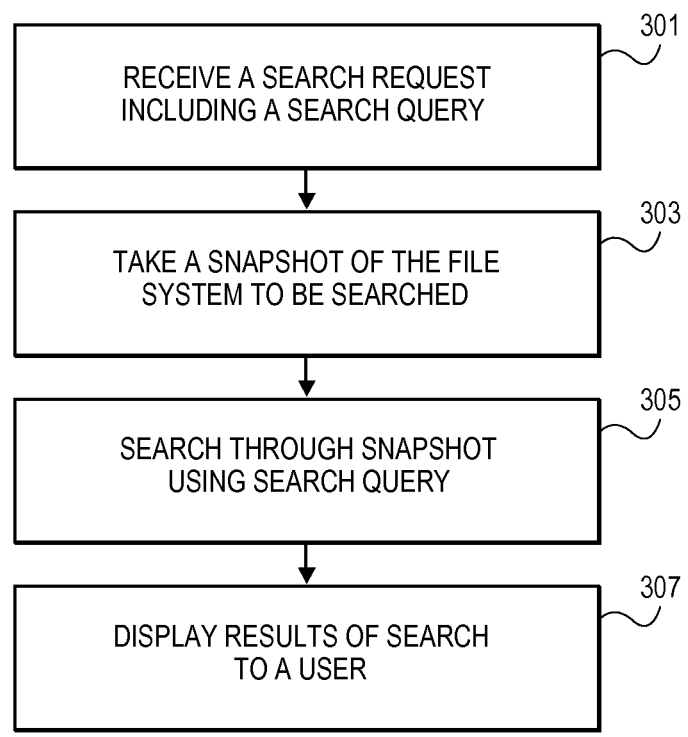
FIG. 3 is a flow chart illustrating a method of performing a coherent snapshot search according to an embodiment of the invention.

FIG. 3 is a flow chart illustrating a method of performing a coherent snapshot based search. At block 301, the method receives a search request including a search query. For example, the search request may specify searching the entire file system for files with filenames including a particular text string.

At block 303, the method notes the current state of the file system to be searched to create a snapshot. In one embodiment, a file system with inexpensive snapshots is used. A snapshot may be inexpensive because no data is copied when the snapshot is generated. When data is subsequently changed, the new data may be written in a different location in the file system, leaving the data of the snapshot intact.

At block 305, the method performs a search through the snapshot using the search query. In one embodiment, the search is performed through the snapshot in the same manner as it would be performed through the file system. The search may iterate through the directory structure of the snapshot of the file system, checking each file and directory to determine if any file or directory matches the search query. The search may be of metadata describing a file or directory, such as size, filename, date of creation, date of last modification, etc. The search may be of the content of files. For example, the content of a word processing file or a spreadsheet may be searched. In another embodiment, since changes to the file system do not affect the snapshot, the search is coherent, in that the file system is searched as it existed when the search was initiated.

At block 307, results from the search are displayed to a user on a display device such as a monitor or LCD panel. In other embodiments, the method is implemented as a plug-in, and provides results of the search to another entity for further processing or display. For example, the results may be processed to determine if the location of a search result has changed since the snapshot was taken.

Figure 4:
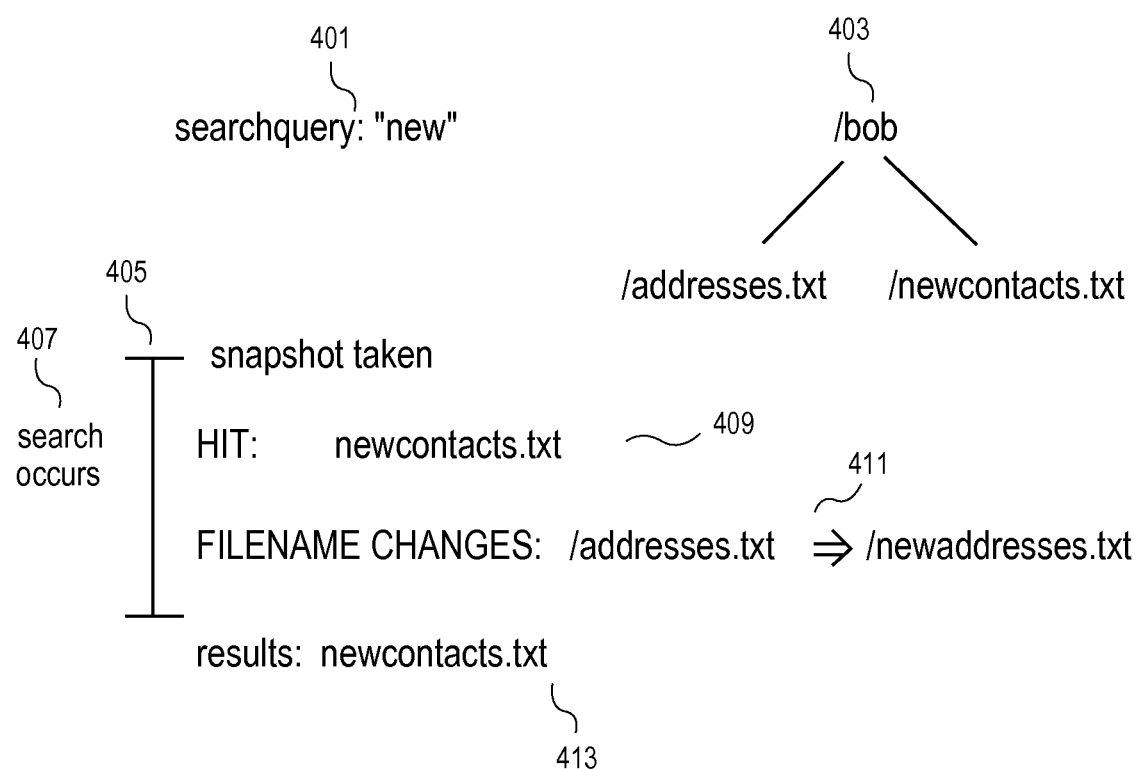
FIG. 4 is a diagram illustrating a coherent snapshot search according to an embodiment of the invention.

FIG. 4 is a diagram illustrating a snapshot search performed by an embodiment of the invention. Search query 401 specifies a search for all files with filenames including the string "new." File system 403 illustrates the structure to be searched at the time the search is initiated. At time 405, a snapshot of file system 403 is taken. As the search of the snapshot progresses over time 407, a hit 409 is identified, a file named "newcontacts.txt." Also occurring during the search a file named "addresses.txt" was renamed 411 to "newaddresses.txt." The modified file was written elsewhere, leaving the snapshot intact. Search result 413 is the file "newcontacts.txt" since that was the only result included in the file system when the search was initiated and the snapshot taken.

Figure 5:
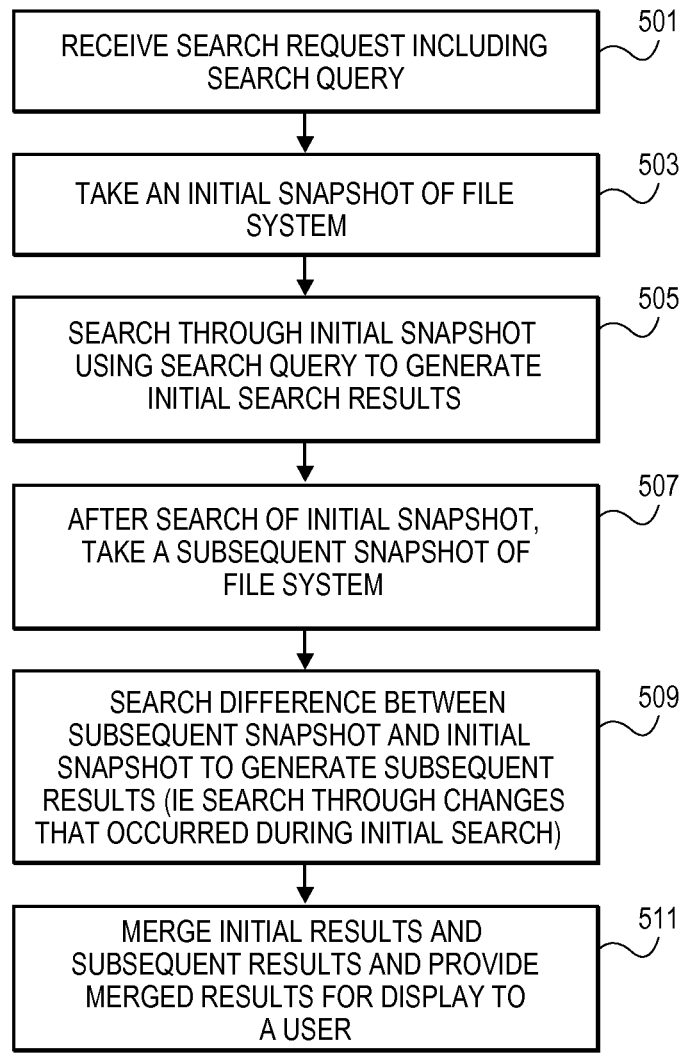
FIG. 5 is a flow chart illustrating a method of performing an approximately real time coherent snapshot search according to an embodiment of the invention.

FIG. 5 is a flowchart illustrating a method of approximating a real time search by searching a file system using two snapshots. At block 501, the method receives a search request including a search query. At block 503, the method takes an initial snapshot of the file system to be searched. At block 505, the method searches through the initial snapshot using the search query to generate initial search results.

At block 507, the method takes a subsequent snapshot of the file system after the initial search has completed. The subsequent snapshot includes any changes made to the file system since the initial snapshot was taken.

At block 509, the method searches the difference between the initial snapshot and the subsequent snapshot using the search query. This has the effect of limiting the subsequent search to changes made to the file system while the initial search was running. In one embodiment, searching the difference between the two snapshots consumes significantly less time and resources than searching the entire subsequent snapshot. In one embodiment, the difference is computed by identifying which blocks are different between the initial snapshot and the subsequent snapshot. By working backward from the list of changed blocks, files that changed between the two points in time corresponding to the snapshots can be identified.

At block 511, results of the initial search and the subsequent search are merged together. The merged results may be provided for display to a user. Merged results may have some overlap. For example, the subsequent search may find a file also found in the initial search, but in a different location. In this case, the subsequent result would be included in the merged results and the initial result discarded. As another example, a download being conducted by a web browser may complete during the initial search, which may cause the downloaded file to be renamed from a temporary file in a temporary directory (i.e., a directory that may be ignored during searches) to a meaningful filename in a download directory. If the meaningful filename matches the search query, the subsequent results and thus the merged results would include the downloaded file.

Figure 6:
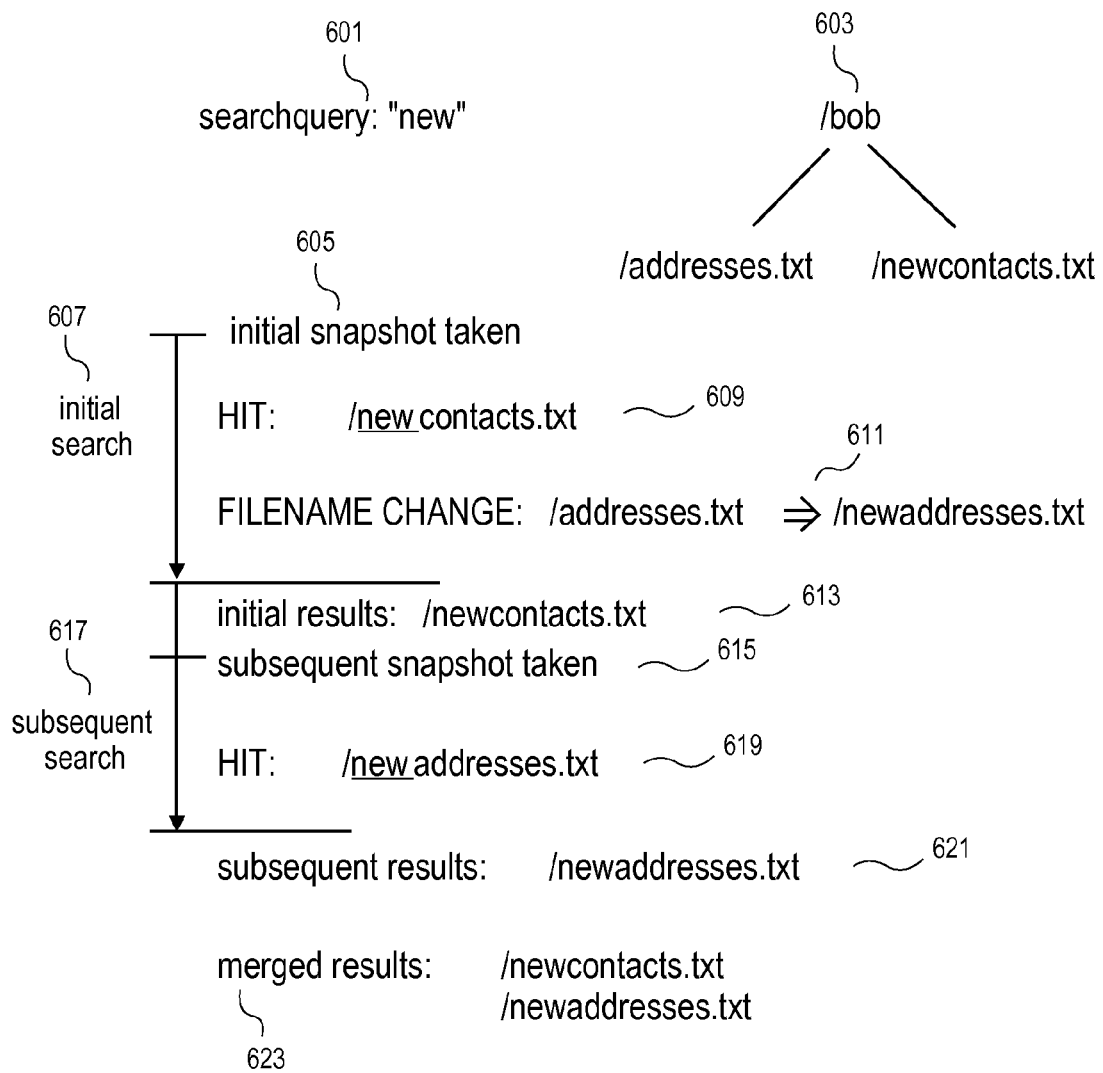
FIG. 6 is a diagram illustrating an approximately real time coherent snapshot search according to an embodiment of the invention.

FIG. 6 is a diagram illustrating a snapshot search according to an embodiment of the invention. Search query 601 indicates to search for files with filenames including the string "new." File system 603 illustrates the state of the file system at the time the search is initiated. At time 605, an initial snapshot is taken of file system 603. The initial search finds the result 609. Also during the initial search 607, a filename change 611 occurs.

After initial search 607, initial results 613 include one file matching the search query. At time 615, a subsequent snapshot of file system 603 is taken. Subsequent search 617 identifies search hit 619, which was modified during initial search 607. After subsequent search 617 is complete, subsequent results 621 include hit 619. The results are merged to generate merged results 623, which may be provided to a user for display.

Figure 7:
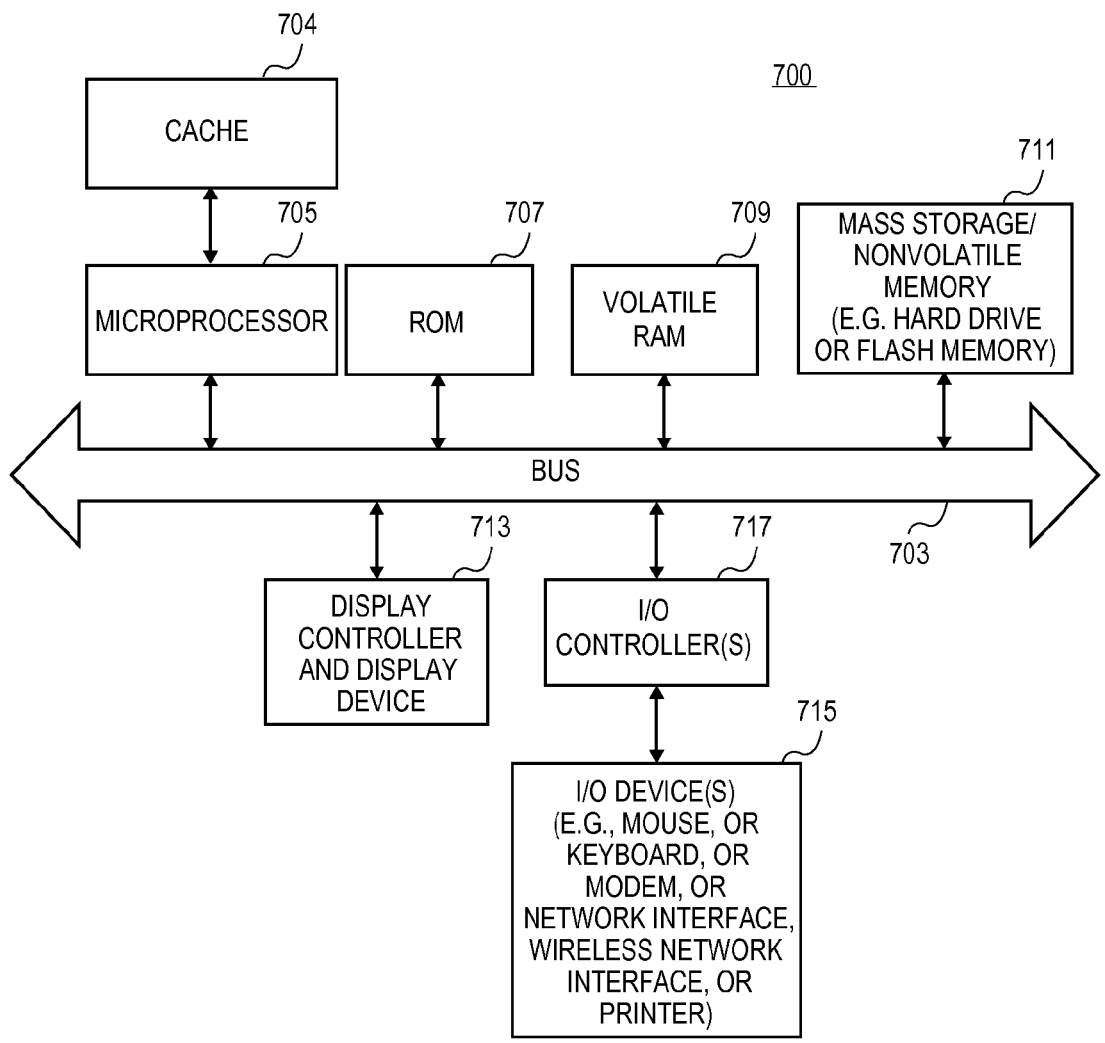
FIG. 7 is a diagram of a data processing system suitable for practicing an embodiment of the invention.

FIG. 7 shows one example of a data processing system which may be used with one embodiment the present invention. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 is coupled to cache 704. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 713 and to peripheral devices such as input/output (I/O) devices which may be mice, keyboards, modems, network interfaces, wireless network interface, printers and other devices which are well known in the art. A wireless network interface may include a WiFi transceiver, an infrared transceiver, a Bluetooth transceiver, and/or a wireless cellular telephony transceiver. Typically, the input/output devices 715 are coupled to the system through input/output controllers 717. The volatile RAM (Random Access Memory) 709 is typically implemented as dynamic RAM (DRAM) which requires power continually in order to refresh or maintain the data in the memory.

The mass storage 711 is typically a magnetic hard drive or a magnetic optical drive or an optical drive or a DVD RAM or a flash memory or other types of memory systems which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art. A file system may be included on a single mass storage device or may span several mass storage devices of different types, including networked storage.

Figure 8:
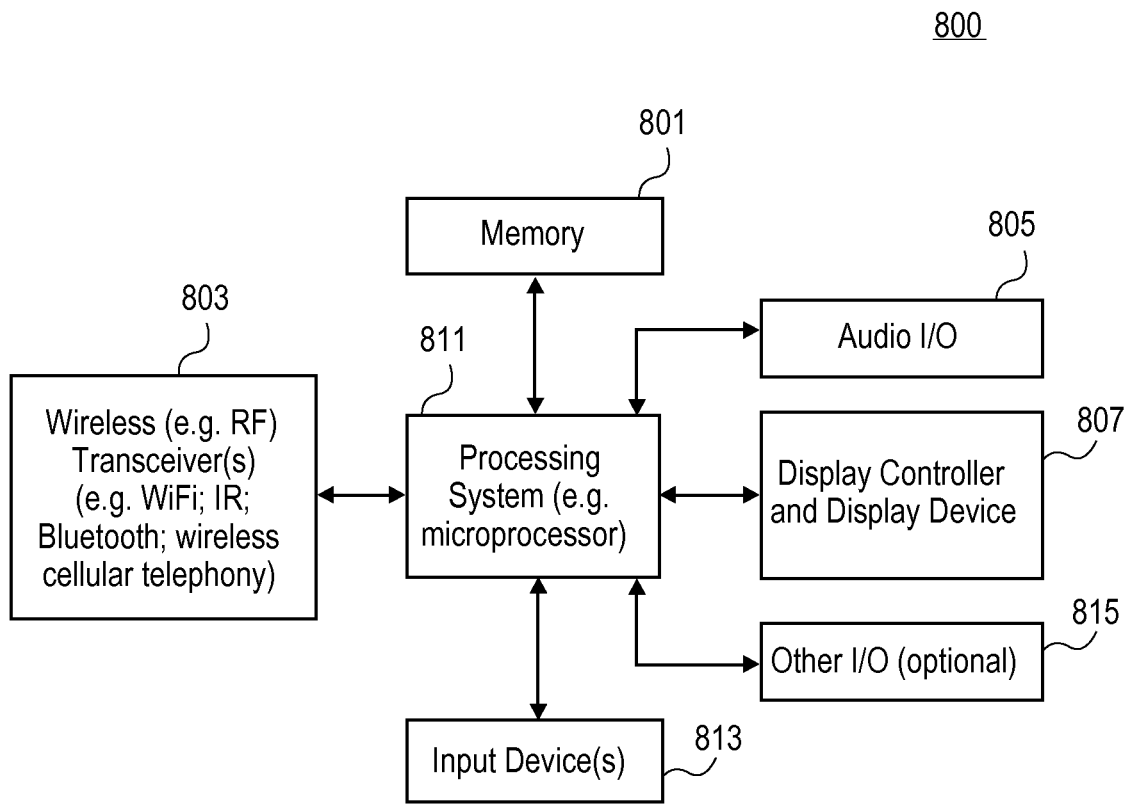
FIG. 8 is a diagram of another data processing system suitable for practicing an embodiment of the invention.

FIG. 8 shows an example of another data processing system which may be used with one embodiment of the present invention. The data processing system 800 shown in FIG. 8 includes a processing system 811, which may be one or more microprocessors, or which may be a system on a chip integrated circuit, and the system also includes memory 801 for storing data and programs for execution by the processing system. The system 800 also includes an audio input/output subsystem 805 which may include a microphone and a speaker for, for example, playing back music or providing telephone functionality through the speaker and microphone.

A display controller and display device 807 provide a visual user interface for the user; this digital interface may include a graphical user interface which is similar to that shown on a Macintosh computer when running OS X operating system software. In one embodiment of the invention, the snapshot search runs entirely in the operating system kernel, for example, the kernel of the OS X operating system. The system 800 also includes one or more wireless transceivers 803 to communicate with another data processing system, such as the system 700 of FIG. 7. A wireless transceiver may be a WiFi transceiver, an infrared transceiver, a Bluetooth transceiver, and/or a wireless cellular telephony transceiver. It will be appreciated that additional components, not shown, may also be part of the system 800 in certain embodiments, and in certain embodiments fewer components than shown in FIG. 8 may also be used in a data processing system.

The data processing system 800 also includes one or more input devices 813 which are provided to allow a user to provide input to the system. These input devices may be a keypad or a keyboard or a touch panel or a multi touch panel. The data processing system 800 also includes an optional input/output device 815 which may be a connector for a dock. It will be appreciated that one or more buses, not shown, may be used to interconnect the various components as is well known in the art. The data processing system shown in FIG. 8 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 800 may be a network computer or an embedded processing device within another device, or other types of data processing systems which have fewer components or perhaps more components than that shown in FIG. 8.

In one embodiment, a machine readable storage medium such as mass storage 711 or RAM 709 stores instructions which when executed by a processor such as microprocessor 705 or processing system 811, causes the processor to perform a method such as the methods illustrated in FIGS. 3 and 5.

In another embodiment, a method such as the methods illustrated in FIGS. 3 and 5 may be performed by a data processing system such as the data processing systems of FIG. 7 or FIG. 8.

In still another embodiment, file system 201 and snapshot 203 may be stored on mass storage 711. Instructions for snapshot generation, searching snapshots, merging search results, and displaying search results may be executed by a processor such as microprocessor 705. Search results may be displayed on a display device such as display device 713. Search queries and search requests may be input using I/O devices 715.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of searching a file system, the method comprising:

generating, in response to receiving a search request from a user, a first snapshot of the file system that includes full text content and metadata for files in the file system, wherein the search request includes a search query specifying data to be searched for in the file system;

performing, by a data processing system, a search of the first snapshot, wherein the search is through the full text content and the metadata in the snapshot instead of the full text content and the metadata in the file system, and wherein the search generates first search results including files having data matching the search query;

generating, after performing the search of the first snapshot, a second snapshot of the file system in response to receiving the search request from the user;

determining a difference between the first snapshot and the second snapshot, the difference comprising files that changed in the file system after the first snapshot was generated;

performing a search of the difference between the first snapshot and the second snapshot to generate second search results including files that changed in the file system after the first snapshot was generated and that have data matching the search query;

combining the first results and the second results; and displaying the combined search results on a display device.

2. The method of claim 1 wherein the file system is a tree-based file system.

3. The method of claim 1, further comprising:

displaying results of the search through the first snapshot.

4. A non-transitory machine readable storage medium storing instructions which when executed by a processor cause the processor to perform a method of searching a file system, the method comprising:

in response to receiving a search query from a user, causing an initial snapshot of the file system to be created that includes full text content and metadata for files in the file system, wherein the search query specifies data to be searched for in the file system;

searching through the initial snapshot using the search query to generate initial results, wherein the search is through the full text content and the metadata in the initial snapshot instead of the full text content and the metadata in the file system, and wherein the initial results include files having data matching the search query;

after searching through the initial snapshot, causing a subsequent snapshot of the file system to be created in response to receiving the search query from the user;

searching a difference between the subsequent snapshot and the initial snapshot to generate subsequent results comprising files that changed in the file system after the initial snapshot was generated and having data matching the search query;

combining the subsequent results into the initial results; and displaying the combined results to a user.

5. The non-transitory machine readable storage medium of claim 4 wherein the file system is a tree-based file system.

6. A data processing system comprising:

a processor;

a memory coupled to the processor through a bus;

an input/output device coupled to the processor through the bus;

a display device coupled to the processor through the bus;

a file system stored on a machine readable storage device coupled to the processor through the bus;

instructions stored in the memory which when executed by the processor cause the processor to:

receive a search query from a user through the input/output device, wherein the search query specifies data to be searched for in the file system, snap a current state of the file system to be searched to create a first snapshot in response to receiving the search query from the user, the first snapshot including the full text content and metadata for elements in the file system, search the first snapshot for elements matching the data in the search query, wherein the search is through the full text content and the metadata of elements in the first snapshot instead of the full text content and the metadata in the file system, in response to completing the search, snap a state of the file system after the search to create a second snapshot in response to receiving the search query from the user, compute a difference between the first snapshot and the second snapshot, the difference comprising elements that changed in the file system after the first snapshot was generated, search the difference between the first snapshot and the second snapshot for elements that changed after the first snapshot was generated and have data matching the search query, combine results of the search of the first snapshot with results of the search of the difference, and display the combined results of the searches on the display device.

7. An apparatus comprising:

means for receiving a command from a user to search a tree-based file system, the command comprising a search query specifying data to be searched for in the file system;

means for taking an initial snapshot of the tree-based file system that includes full text content and metadata for files in the file system in response to receiving the search query from the user;

means for searching, by a hardware device, through the full text content and the metadata in the initial snapshot using the search query to build a set of initial results that includes files having data that matches the search query, wherein the search is through the full text content and the metadata in the initial snapshot instead of the full text content and the metadata in the file system;

means for taking a subsequent snapshot of the tree-based file system in response to receiving the search query from the user;

means for generating a difference between the subsequent snapshot and the initial snapshot, the difference comprising files that changed in the file system after the initial snapshot was generated;

means for searching through the difference between the subsequent snapshot and the initial snapshot using the search query to build a set of subsequent results that includes files that changed after the first snapshot was generated and having data matching the search query;

means for building a set of merged results comprising a union of the set of initial results and the set of subsequent results; and means for displaying the set of merged results on a hardware display device.

8. The apparatus of claim 7 wherein searching through the initial snapshot comprises searching through metadata associated with files stored in the tree-based file system and further comprises searching through full text content associated with the files.

* * * * *